United States Patent
Kent et al.

(10) Patent No.: US 6,297,811 B1
(45) Date of Patent: Oct. 2, 2001

(54) PROJECTIVE CAPACITIVE TOUCHSCREEN

(75) Inventors: Joel Kent, Fremont; Arie Ravid, Newark, both of CA (US)

(73) Assignee: ELO TouchSystems, Inc., Fremont, CA (US)

( * ) Notice: Subject to any disclaimer, the term of this patent is extended or adjusted under 35 U.S.C. 154(b) by 0 days.

(21) Appl. No.: 09/324,346

(22) Filed: Jun. 2, 1999

(51) Int. Cl.[7] .................................................. G09G 5/00

(52) U.S. Cl. .................... 345/173; 178/18.01; 178/18.06

(58) Field of Search ................................. 345/156, 173, 345/174; 178/18.01, 18.06

(56) References Cited

U.S. PATENT DOCUMENTS

| | | | |
|---|---|---|---|
| 4,087,625 | 5/1978 | Dym et al. | 178/19 |
| 4,103,252 | 7/1978 | Bobick | 331/48 |
| 4,495,485 | 1/1985 | Smith | 340/365 C |
| 4,659,874 | 4/1987 | Landmeier | 178/19 |
| 4,686,332 | 8/1987 | Greanias et al. | 178/19 |
| 4,778,951 | 10/1988 | Pepper, Jr. et al. | 178/18 |
| 4,954,823 | 9/1990 | Binstead | 341/26 |
| 4,999,462 | 3/1991 | Purcell | 178/19 |
| 5,117,071 | 5/1992 | Greanias et al. | 178/19 |
| 5,650,597 | 7/1997 | Redmayne | 178/19 |
| 5,844,506 | 12/1998 | Binstead | 341/34 |

FOREIGN PATENT DOCUMENTS

| | | | |
|---|---|---|---|
| 0727 875 A1 | 8/1996 | (EP) | H03K/17/96 |
| 2 295 017 A | 5/1994 | (GB) | H00K/17/98 |
| WO 95/27334 | 10/1995 | (WO) | H03K/17/96 |
| WO 96/15464 | 5/1996 | (WO) | G01V/3/08 |
| WO 88/05577 | 7/1998 | (WO) | G06K/11/06 |

Primary Examiner—Kent Chang

(57) ABSTRACT

An improved touchscreen utilizing two sets of electrodes that are fabricated in a single plane is provided. The individual electrodes of each set of electrodes are formed from a continuous length of a conductive material. Suitable electrode materials include fine wire and deposited conductive coatings. The overall electrode pattern is such that there is no overlap of electrodes, thus eliminating the need for insulating layers and/or coatings between electrodes. Although a variety of electrode patterns can be used, preferably the pattern is comprised of a plurality of approximately triangularly shaped electrodes, the pattern such that the base of one triangularly shaped electrode is adjacent to the apex of the next triangularly shaped electrode. The preferred triangular shape of an individual electrode can be achieved by forming a continuous loop of the electrode material into the desired shape or by forming a series of teeth of varying height, the envelope of the teeth approximating the desired triangular shape. A touchscreen sensor employing the disclosed sensing electrodes can use any of a variety of readout systems. For example, a frequency-domain readout approach can be used in which the operating frequency is fixed. In this approach a touch capacitance is detected by observing an impedance change at the operating frequency, typically by measuring a corresponding current change. Alternately changes in a RC decay time $\tau$ can be measured, for example by observing frequency shifts in a relaxation oscillator. This technique is typically referred to as a time-domain approach. In a third alternate approach, capacitance changes are detected via frequency shifts of LC oscillators. Touch position information is determined from the capacitance changes of the electrodes using any number of different techniques. Preferably prior to calculating position, a subset of electrodes localized around the touch position is determined. Electrode localization reduces the effects of background signals while increasing the efficiency of the position determining algorithm. Once a set of localized electrodes has been determined the touch coordinates are calculated, one coordinate from the distribution of the touch signal within each set of electrodes and the other coordinate from the distribution of the touch signal between the two sets of electrodes.

24 Claims, 5 Drawing Sheets

PROJECTIVE CAPACITIVE TOUCHSCREEN

TECHNICAL FIELD OF THE INVENTION

The present invention relates generally to touchscreens and, more particularly, to a projective capacitive touchscreen suited for outdoor use.

BACKGROUND OF THE INVENTION

Touchscreens are well-established computer input devices. Uses of touchscreens include point-of-sale applications like cash registers at fast-food restaurants, point-of-information applications such as department store information kiosks, and ticketing applications such as airline-ticket kiosks. As touchscreen technologies mature, the range of applications increases. To the extent that touchscreen technology can economically be made weather resistant and vandal resistant, the market for touchscreens will expand into outdoor and semi-outdoor applications.

Commercially available touchscreens utilize a variety of different touch detection mechanisms. These detection mechanisms include interruption of infrared (IR) optical beams; electrical contact to a voltage gradient on a transparent resistive coating via flexing of a flexible coversheet; absorption of ultrasonic acoustic waves propagating along the touchscreen surface; capacitive shunting of an oscillating current through either a very thin or a thick dielectric layer to a user's finger and then through the user's body to ground; and detection of a touch on a touchscreen via force sensors supporting the corners of the screen.

To date, the touchscreen market has been dominated by resistive, acoustic, and thin-dielectric capacitive touchscreens. For a variety of reasons, however, it is doubtful that any of these can fully meet the requirements imposed by an outdoor application. For example, the plastic coversheet used in a resistive touchscreen is easily vandalized by sharp objects (e.g., knives) or by burning (e.g. cigarettes). Similarly, shallow scratches on the surface of a thin-dielectric capacitive touchscreen can lead to unacceptable distortion in the measured touch coordinates thus making the touch detection mechanism susceptible to vandalism as well. Acoustic touchscreens are affected by water contaminants and therefore are typically not selected for any application in which the touchscreen may be directly or even indirectly exposed to rain (e.g., water dripping from wet clothes or an umbrella).

One type of touch detection mechanism that appears to be well suited for outdoor applications is based on a thick-dielectric capacitive touchscreen. Such systems are often referred to as projective capacitive touchscreens since the detection mechanism involves projecting electric fields through a thick dielectric layer. This type of touchscreen is fundamentally insensitive to moisture, e.g., rain drops, on the touch surface. Additionally, the material comprising the exterior touch surface plays no fundamental role in the touch detection mechanism, thus providing design flexibility. For example, a replaceable, low-cost layer can be used as the exterior touch surface.

In a typical projective capacitive sensor, three transparent substrates (e.g., glass) are laminated together, each substrate having a patterned transparent resistive coating. The patterned resistive coatings are fabricated from a material such as ITO or ATO. Silver frit traces are typically used to couple the patterned coatings to the detection electronics. In one configuration, the underside of the top substrate layer has horizontal Y-measuring electrodes while the top surface of the middle substrate glass has vertical X-measuring electrodes. The upper Y-measuring electrodes can be patterned in such a way as to minimize shielding of the underlying X-electrodes. The top surface of the bottom substrate layer contains a back guard electrode to isolate the sense electrodes from the electronic environment behind the touchscreen (i.e., display device). Thus in this configuration the X- and Y-electrodes are contained within separate planes.

In this type of projective capacitive sensor, the stray capacitive cross-coupling between the X- and Y-measuring electrodes is inversely proportional to the distance between the X- and Y-electrode planes. Therefore reducing the gap between the X- and Y-electrode planes increases the capacitive cross-coupling, possibly leading to an increase in the demands placed on the associated electronics.

PCT application WO 95/27334 and U.S. Pat. No. 5,844,506 disclose another type of projective capacitive touchscreen utilizing fine wires of between 10 and 25 micrometers thick as the electrodes. A variety of techniques are disclosed for electrically isolating the electrodes. For example in one configuration the two sets of electrodes, i.e., the X- and Y-electrodes, are applied to opposite faces of a thin dielectric film. In another configuration the two sets of electrodes are applied to the same side of the dielectric substrate or film. Methods of electrically isolating the sets of electrodes include the deposition of an insulating layer between the two electrode sets, the insulating layer either being continuous over the entire touchscreen surface or applied locally to the intersections of the two electrode sets. In at least one of the disclosed touchscreen systems, the dielectric support substrate or film as well as the two sets of electrodes are encapsulated in a dielectric laminate, thereby eliminating the influence of moisture as well as providing a constant dielectric environment in the immediate proximity of the electrodes.

U.S. Pat. No. 4,954,823, by the same inventor as PCT Application No. WO 95/27334, discloses a touchscreen control system for use with projective capacitive touchscreens such as those disclosed in the PCT application. In the disclosed control system the electronics measure changes in sense-electrode capacitances due to touches via shifts in the frequency of a RC-time-constant controlled oscillator. A similar technique utilizing a RC-time-constant controlled oscillator for measuring the capacitance changes in a touch sensor is disclosed in U.S. Pat. No. 4,103,252.

U.S. Pat. No. 5,650,597 discloses a projective capacitive touchscreen in which both the X- and Y-electrodes are formed in a single plane, the electrodes arranged as an array of horizontal sensor bars. A control circuit provides an excitation signal to the electrodes and receives a differential signal from the electrodes, the differential sensing signal providing touch position. In order to determine horizontal position, the excitation signal is provided to one side of the array and the sensing signal is received on the other side of the array. A similar array of unidirectional electrodes and a method of obtaining both X- and Y-coordinate information therefrom is disclosed in U.S. Pat. No. 4,778,951. Projective capacitive touchscreen designs such as those disclosed in U.S. Pat. Nos. 4,778,951 and 5,650,597 are dependent upon manufacturing processes that produce transparent conductive coatings of uniform resistivity that are substantially free of defects that can break the electrical continuity of the coating.

PCT Application No. WO 96/15464 discloses a controller for use with a variety of touchscreen sensor array types. The signals from the array are processed both in the analog and digital domains, thus achieving reliable touch detection. In one of the disclosed signal processing techniques, the information from several sensor areas is interpolated to achieve fine positional resolution. The disclosed sensor arrays include a single surface array of pads that is substantially symmetrical, an asymmetrical array of pads (e.g., "Backgammon grid"), and dual orthogonal arrays arranged on different substrate layers.

A projective capacitive touchscreen using two sets of sensing electrodes applied to a single substrate surface to accurately determine the X- and Y-coordinates of a touch is desired. The present invention provides such a system.

SUMMARY OF THE INVENTION

The present invention provides an improved touchscreen utilizing two sets of electrodes fabricated in a single plane. The individual electrodes of each set of electrodes are formed from a continuous length of a conductive material such as a fine wire or a deposited conductive coating. The overall electrode pattern is such that there is no overlap of electrodes, thus not requiring insulating layers, coatings, etc. between electrodes.

In accordance with the invention, a variety of different electrode patterns can be used. In one such electrode pattern, each electrode is comprised of a loop of conductive material, the loop substantially triangular in shape. The geometry of adjacent electrodes is reversed, ie., positioning the base of the first triangularly shaped electrode adjacent to the apex of the next triangularly shaped electrode, etc. The electrode width and the electrode-to-electrode spacing determine the number of electrodes that can be fit within a given area. The number of electrodes affects both the complexities associated with the required electronics and the position determining algorithm as well as the achievable positional resolution. The positional resolution is also affected by the shape of the electrode edges, for example straight edges versus jagged edges.

In another electrode pattern according to the invention, each electrode is comprised of a series of teeth, the shape and density of the teeth being determined by such factors as ease of manufacturing and desired positional resolution By varying the height of the individual teeth, the general shape of each electrode is approximately triangular. The triangular shapes of the alternating electrodes are complementary such that the base of the first electrode is adjacent to the apex of the next electrode.

A touchscreen sensor using the sensing electrodes of the present invention can use any of a variety of readout systems. For example, a frequency-domain readout approach can be used in which the operating frequency is fixed. In this approach a touch capacitance is detected by observing an impedance change at the operating frequency, typically by measuring a corresponding current change. Alternately changes in a RC decay time τ can be measured, for example by observing frequency shifts in a relaxation oscillator. This technique is typically referred to as a time-domain approach. In a third alternate, capacitance changes can be detected via frequency shifts of LC oscillators.

In order to determine touch position information using the electrodes of the present invention, any of a number of techniques can be used. Preferably prior to determining touch position, a subset of the electrodes that are localized around the touch position is determined. Electrode localization reduces the effects of background signals while increasing the efficiency of the position determining algorithm. Once a set of localized electrodes has been determined the touch coordinates are calculated, one coordinate from the distribution of the touch signal within each set of electrodes and the other coordinate from the distribution of the touch signal between the two sets of electrodes.

A further understanding of the nature and advantages of the present invention may be realized by reference to the remaining portions of the specification and the drawings.

DESCRIPTION OF THE SPECIFIC EMBODIMENTS

Sensing Electrode Designs

Figure 1:
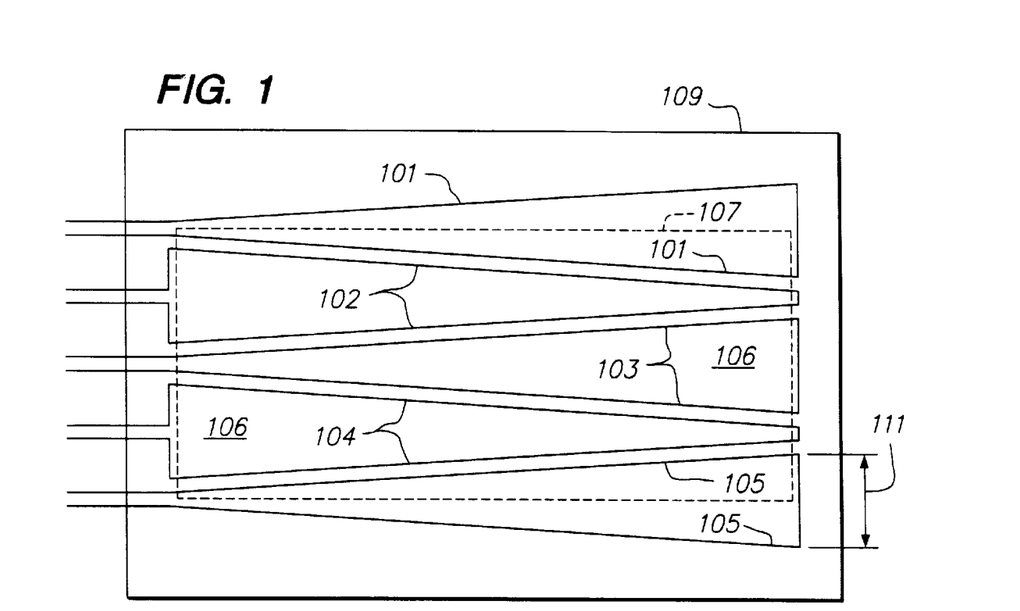
FIG. 1 is an illustration of a portion of one electrode array design according to the present invention.
Figure 2:
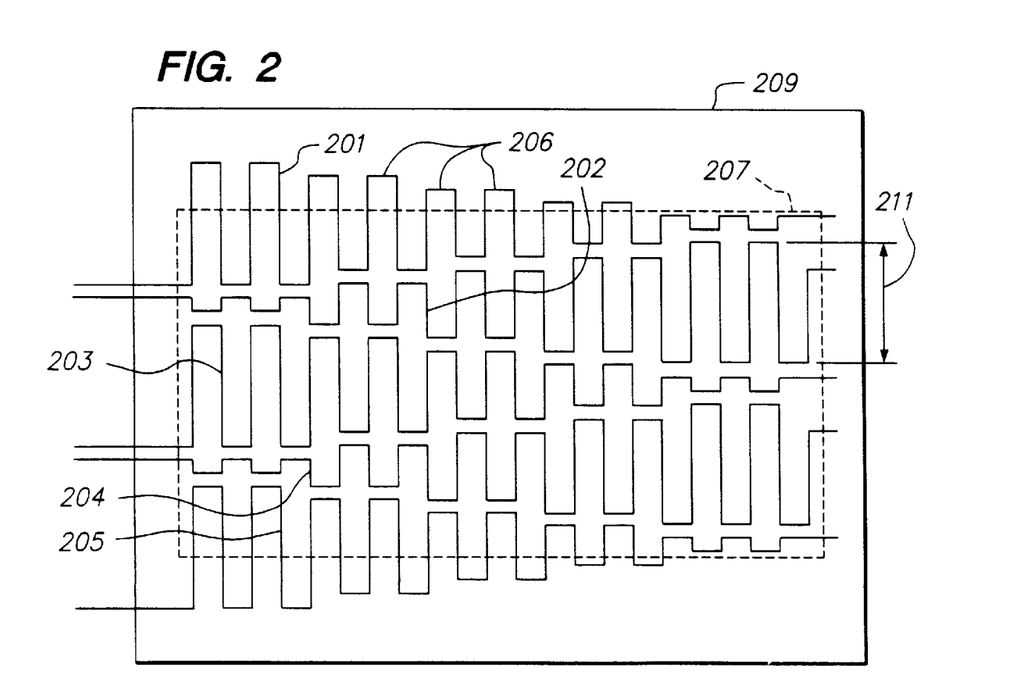
FIG. 2 is an illustration of a portion of an alternate electrode array design according to the present invention.

FIGS. 1 and 2 illustrate portions of two different electrode array designs according to the present invention. In FIG. 1, electrodes 101–105 are formed of individual, continuous loops of a conductive material such that within a touchscreen sensing area 107 electrodes 101–105 form a series of approximately triangular shapes in an alternating pattern. It should be understood that, unlike a pad-type electrode, the area 106 within each triangularly shaped electrode is not conductive. The electrode configuration shown in FIG. 2 consists of a plurality of electrodes 201–205 each formed of a continuous length of conductive material. Each electrode 201–205 is comprised of a plurality of teeth 206 of varying height, the envelope of teeth 206 approximating a triangular shape. It should be understood that the shape of teeth 206 in FIG. 2 is only illustrative; other teeth shapes can be used with the present invention. It should also be understood that the present invention can utilize both electrode loops (e.g. electrodes 101–105) and non-loops (e.g., electrodes 201–205). As in FIG. 1, electrodes 201–205 cover a touchscreen sensing area 207.

Electrodes 101–105 and 201–205 shown in FIGS. 1 and 2, respectively, can be fabricated from any conductive material. In the preferred embodiment the electrodes are fabricated from fine metal wires, preferably between 10 and 25 micrometers thick. Alternately, the electrodes can be fabricated from a deposited conductive coating patterned using a screen printing, photographic, or other process. If sufficiently fine lines are deposited, e.g., less than 25 micrometers in width, then the conductive coatings need not be transparent. If a transparent conductive coating such as ITO, ATO, or fluorine-doped tin oxide is used, then relatively wide line widths may be used. Fine wire electrodes are preferred due to the susceptibility of electrode line breaks in transparent conductive coatings. The electrodes are attached to a substrate 109 in FIG. 1 and a substrate 209 in FIG. 2. Substrates 109 and 209 can be of glass, a polymer film such as a PET, or other suitable material as is well known by those of skill in the art.

It should be understood that the electrode designs shown in FIGS. 1 and 2 are merely illustrative, the inventors recognize that there are countless minor variations of these designs that can be used with the present invention. Many of the possible variations are given by the overall system requirements. For example, in order to achieve greater resolution, more electrodes can be fit within a given area. Additionally, the slope of the electrodes, the spacing between electrodes, the spacing between electrode segments, etc. can be changed to meet the system design requirements.

The electrode designs of the present invention provide many advantages over prior electrode designs. First, since there is no overlap of individual electrodes, all of the electrodes can be formed on a single plane thus minimizing the number of required touchscreen substrates and lowering manufacturing costs. Second, as the electrodes do not overlap as noted above, the individual electrodes need not be insulated. Therefore, if fine wire electrodes are used, no insulating coating is required. Eliminating the insulating material further reduces visual obstruction from the electrodes.

Figure 3:
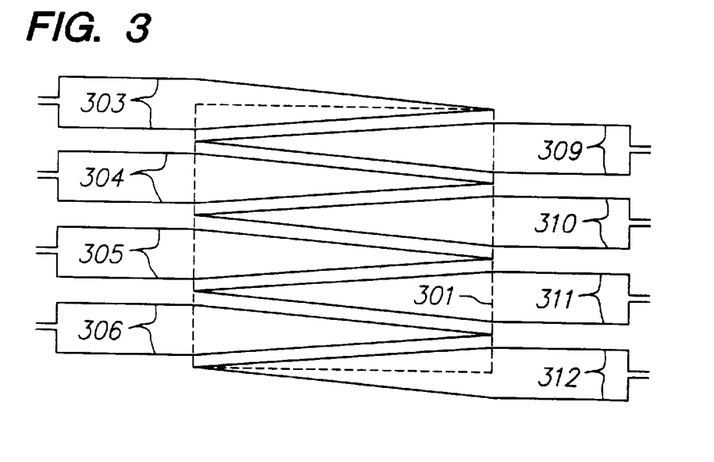
FIG. 3 is an illustration of a portion of an alternate embodiment of an electrode array design according to the present invention.

FIG. 3 is an illustration of a portion of an alternate embodiment of an electrode array that is similar to that shown in FIG. 1. In this design there is a central electrode region 301 in which portions of electrodes 303–306 are adjacent to portions of electrodes 309–312. Therefore in central region 301 there is enhanced X- and Y-coordinate resolution while on either side of central region 301 there is only limited Y-coordinate information. This type of design is ideal for use in applications in which it is desirable to integrate a fully functional touchscreen (ie., central portion) with a side touch-button input system.

Figure 4:
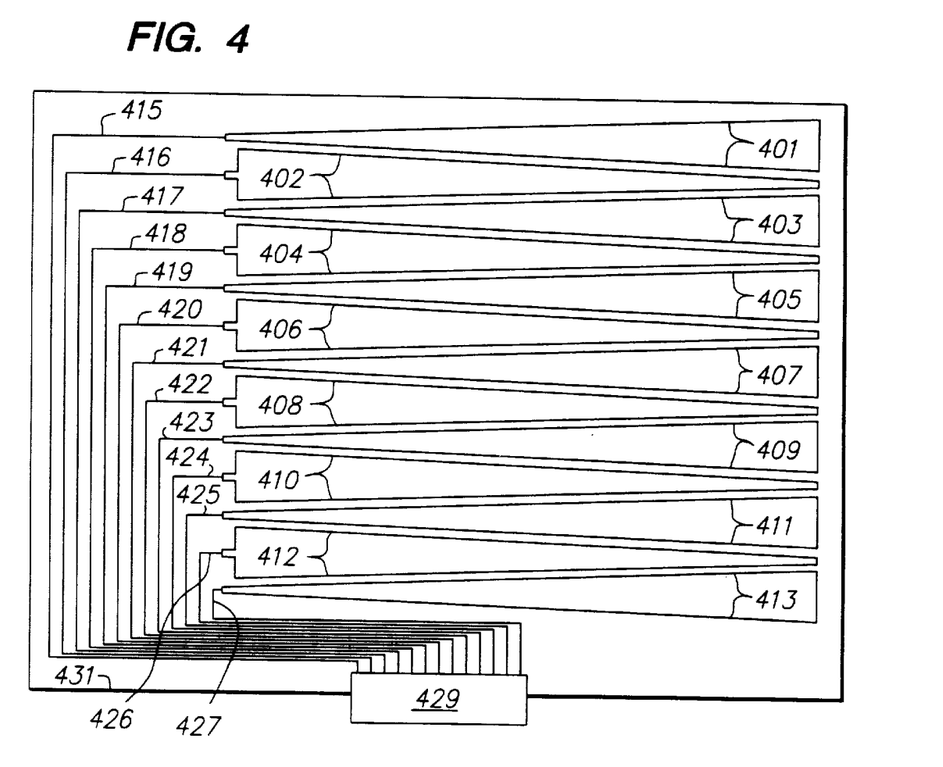
FIG. 4 is an illustration of an electrode interconnect design.

There are a variety of methods that can be used to electrically connect the electrodes of the present invention with the touchscreen electronics. For example, if fine wire electrodes 401–413 are used as illustrated in FIG. 4, the fine wires can provide interconnect traces 415–427 to a connector 429. If the electrodes are fabricated from a transparent conductive coating such as ITO, interconnects 415–427 can be fabricated from silver-frit (e.g., on glass) or conductive-ink (e.g., on glass or polymer film).

Another advantage of the present invention is that it allows the interconnection between the sensing electrodes and the electronics to have a much larger impedance than is allowed in other touchscreen designs (e.g., resistive touchscreens). In the present system the impedance between the electrodes and the electronics must be smaller than the impedance of the stray capacitance from a sensing electrode and an adjacent sensing or guard electrode. For example, at an operating frequency of 30 kilohertz (i.e., kHz), a typical value of stray capacitance of 50 picofarads (i.e., pF) corresponds to an (imaginary) impedance of $1/(2\pi fC)=106$ kilohms (i.e., k$\Omega$). Thus the interconnect impedance must only be small compared to about 100 k$\Omega$. As a result of this requirement, the manufacturing options for interconnections are increased.

Figure 5:
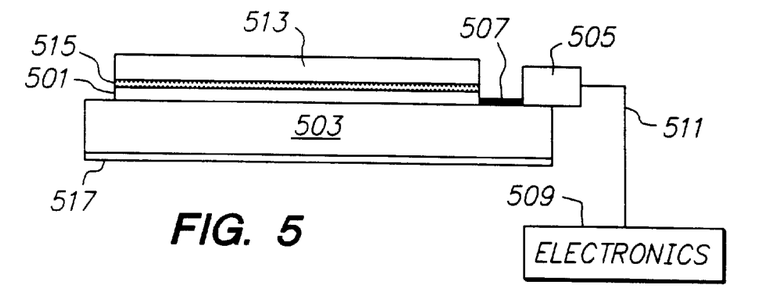
FIG. 5 illustrates a cross-section of one embodiment of the invention.

A variety of touchscreen cross-sections can be used with the present invention. For example as illustrated in FIG. 5, a plurality of electrodes 501 are attached to a substrate 503. Electrodes 501 are coupled to a connector 505 via interconnects 507. Connector 505 is then, in turn, coupled to touchscreen electronics 509 via a flexible cable 511. A replaceable polymer (e.g., polycarbonate) touch surface 513 can be mechanically coupled to the electrode array, for example with an adhesive layer 515, making it difficult to shatter the underlying glass substrate. Additionally, even if touch surface 513 is damaged, for example by vandals, it can be easily replaced. Optionally, a guard electrode 517 can be deposited on the bottom surface of substrate 503 to minimize the effects of stray capacitances between the sense electrodes and, for example, a display device placed behind the touchscreen. Also, as shown in FIG. 4, a perimeter guard electrode 431 can be provided in the plane of the sense electrodes to minimize the effects of stray capacitances to objects around the perimeter of the touchscreen, e.g., metal associated with the bezel and its supporting structures.

Figure 6:
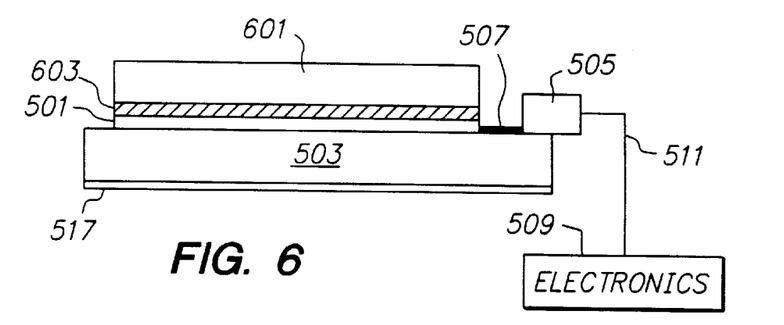
FIG. 6 illustrates a cross-section of an alternate embodiment of the invention.

In an alternate configuration shown in FIG. 6, a second substrate 601 is bonded to the electrode assembly and lower substrate 503 with a safety-glass adhesive 603. A safety-glass is the result of this lamination process.

Equivalent Circuit Analysis

Figure 7:
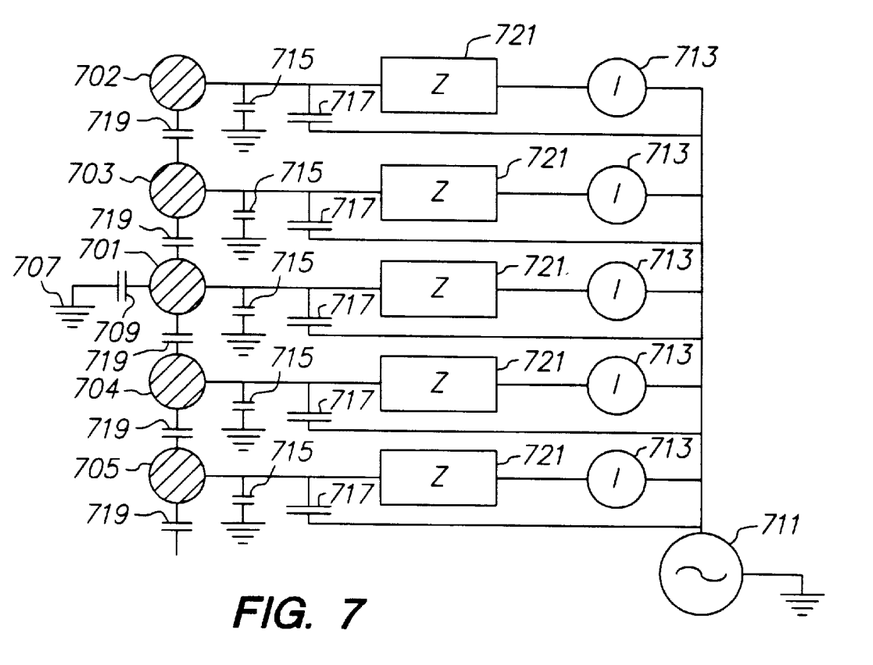
FIG. 7 is an illustration of a circuit equivalent to the electrode array design of the invention.

In order to better understand the present invention, an equivalent circuit is shown in FIG. 7. As illustrated, an electrode 701 with adjacent sensing electrodes 702–705 is capacitively shunted to a ground 707 by the touch of a finger (not shown), represented by a capacitor 709. In practice, a finger will capacitively couple with differing strengths to several neighboring sense electrodes. The distribution of signals on neighboring sense electrodes allows interpolation of the touch coordinate perpendicular to the long axes of the electrodes. For illustration purposes only, however, only one touch capacitance is included in FIG. 7.

The quantitative value of capacitor 709 is of the order of one pF. The exact value depends on several factors including the size of the finger and the thickness and dielectric constant of the material between sense electrode 701 and the finger. For example, if the finger has an effective area, A, of one square centimeter (i.e., 1 cm$^2$) and the material has a thickness, d, of three millimeters (i.e., 3 mm) and a relative dielectric constant of $\epsilon/\epsilon_0=3$, then capacitor 709 is equal to $\epsilon_0 * (\epsilon/\epsilon_0) * (A/d) = (8.85 \text{ pF/m}) * 3 * (10^{-4} \text{ m}^2)/(3*10^{-3} \text{ m}) = 0.885$ pF. In order to support the touch reconstruction algorithms, preferably the electronics measure capacitance changes to a precision of about two orders of magnitude smaller than this, i.e., approximately ±0.01 pF.

Electrodes 701–705 are connected to an oscillating excitation voltage, V, 711. The frequency of operation may be, for example, 30 kHz. Current sensing electronics 713 detects the current drawn by the electrodes when excited by oscillating voltage 711. Therefore if 711 produces 10 volts at 30 kHz and the capacitance of capacitor 709 is approximately 1 pF, then the touch results in a current draw of:

$$\Delta I = V * 2\pi f C$$

$$= 10V * 2\pi * 30 \text{ kHz} * 1 \text{ pF or approximately 2 microamps (i.e., 2 } \mu A).$$ Such current changes for each sense electrode may be measured and digitized. These are the signals processed by the touch algorithms.

A finger touch typically is not the only capacitance between a sensing electrode and ground. The parasitic stray capacitance to ground is represented by a capacitor 715. This capacitance leads to a background current added to the current I measured at 713. In principle, this background current can be subtracted out as an offset in the touch algorithm. In practice, however, it simplifies the electronics design if the capacitance of capacitor 715 is not much larger than the capacitance 709 due to a touch and does not drift rapidly with time.

If desired, capacitance 715 can be greatly reduced by including guard electrodes in the touchscreen assembly design. For example, a guard electrode can be placed between the plane of sensing electrodes and the display device as shown in FIGS. 5 and 6. Guard electrodes are driven with the same excitation voltage used to excite the sensing electrodes. By eliminating the voltage difference between the sensing electrode and the guard electrode, the shunt current through the stray capacitance to the guard electrode (i.e., capacitor 717 in FIG. 7) is approximately 0 (i.e., $\Delta I = \Delta V * 2\pi f C = 0$ because $\Delta V = 0$). Thus the negative effects of the stray capacitance are eliminated when $\Delta V/V < 1\%$ even if the stray capacitance 717 itself remains on the order of 100 pF.

In an alternate embodiment, in addition to using the optional back guard electrode, an optional perimeter guard electrode in the same plane as the sensing electrodes can be used. The capacitor labeled 717 in FIG. 7 represents the total capacitance from the sensing electrode to all guard electrodes.

There is also a stray capacitance between neighboring sense electrodes indicated by capacitor 719. The numerical value of capacitance 719 varies based on a number of parameters including the width of the gap between neighboring electrodes, the length of the gap between neighboring electrodes, and the dielectric constant of the material surrounding the sensing electrodes. The stray capacitance between neighboring electrodes is approximately proportional to the natural log of the ratio of the electrode width to the electrode gap. A reasonable estimate for capacitance 719 is 40 pF although this value may easily vary by a factor of two depending upon the details of the touchscreen design. It should be understood that having a capacitance 719 that is large compared to capacitance 709 is not a problem since the neighboring sensing electrodes (i.e., electrodes 702–704) are driven by excitation voltage 711 and therefore also function as guard electrodes.

The last element in the equivalent circuit shown above is the interconnect impedance 721. In some embodiments impedance 721 is approximately zero. Any impedance, however, with a magnitude in the range of zero to approximately $1(2\pi f C_{719})$ is acceptable. $C_{719}$ is the capacitance of element 719. Advantages of this electronic design freedom are noted below.

If the value of the interconnect impedance 721 becomes too large, then there will be a tendency for the sensing electrode signal current to be diverted via the stray electrode capacitance 719 to neighboring sensing electrodes. This will cause a spreading or blurring of the touch signals as a function of sensing electrode number. These effects have been calculated with SPICE simulations. For example, assuming an operating frequency of 30 kHz, electrode stray capacitance 719 of 40 pF, guard capacitance 717 of 20 pF, and interconnect impedance 721 corresponding to a 200 pF capacitance, more than 75 percent of the current from a given sensing electrode passes through the corresponding current sensing circuit 713. If electrode stray capacitance 719 is increased to 100 pF and if interconnect capacitance is reduced to 100 pF, about 40 percent of the signal current remains in its nominal channel. In this case, the signals may still contain the desired touch information, but the quality of the signal data is starting to show significant degradation.

Therefore the range allowed for impedance 721 extends all the way up to $1/(2\pi f C_{719})$. For typical values of $C_{719}$ and f of 40 pF and 30 kHz, respectively, $1/(2\pi f C_{719}) \approx 130$ k$\Omega$. As a result, the design and manufacturing options for the interconnections are greatly increased.

For clarity of presentation, the above analysis considered the case that the touchscreen sensor will be read out with electronics using a fixed operating frequency. This technique is known as the frequency-domain readout approach. Touch capacitance 709 is detected by observing an impedance change at the operating frequency, typically by measuring a corresponding current change. An alternate approach referred to as the time-domain technique measures changes in a RC decay time $\tau$, typically via observation of frequency shifts in a relaxation oscillator. The touch sensing electrodes of this invention may be used with either type of readout electronics. Therefore although the above analysis emphasizes the frequency-domain, the underlying sensor concepts remain the same.

Another technique that can be used with the projective capacitive sensors of the present invention detects capacitance changes via frequency shifts of LC oscillators. The frequency of a LC oscillator is $f = 2/\sqrt{(LC)}$. A change of capacitance $\Delta C$ leads to a frequency shift $\Delta f = -\frac{1}{2}(\Delta C/C) * f$.

Algorithm

A variety of algorithms can be applied to the signal data from the sensing electrodes of the present invention to determine the X- and Y-coordinates of a touch. A few of these techniques are discussed briefly below although it should be understood that other techniques are equally applicable.

Figure 8:
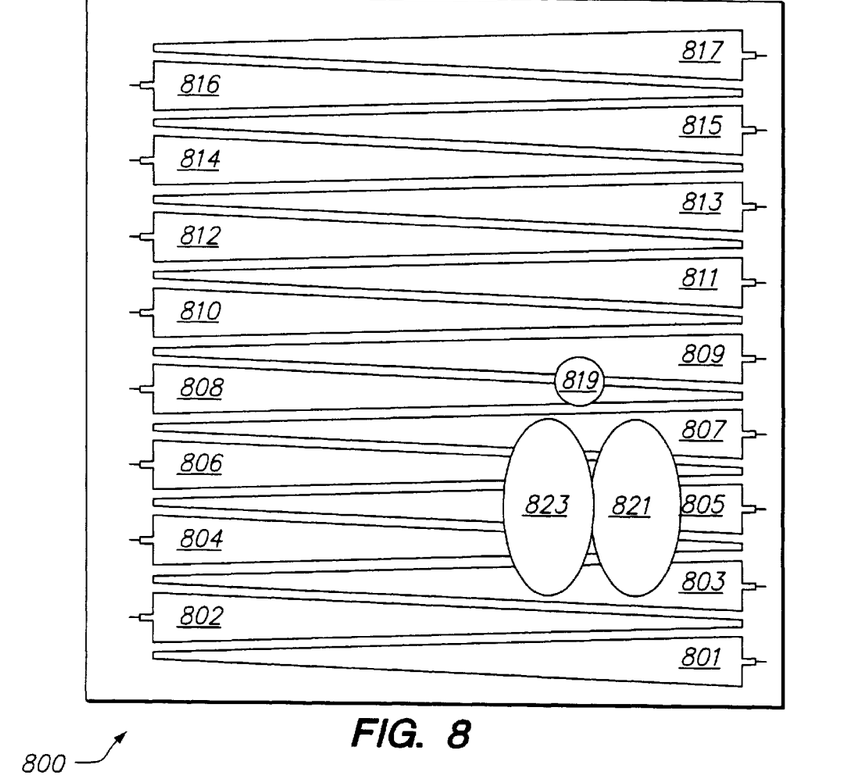
FIG. 8 is an illustration of a touchscreen using 17 triangularly shaped electrodes.

FIG. 8 is an illustration of a touchscreen using 17 triangularly shaped electrodes 801–817 such as those discussed with reference to FIGS. 1 and 4. As in the previous illustrations, the elongated axis of each electrode is parallel to the X-axis although it should be understood that the touchscreen could be designed with the elongated axis parallel to the Y-axis or using a different electrode design (e.g. see FIG. 2). Circle 819 represents the location of contact between touch surface 800 and the tip of the user's index finger. A screen touch at location 819 will couple most strongly to electrode 808, but will also induce signals of varying strengths on electrodes 809 and 807 and perhaps electrodes 806 and 810. The narrower the width of the electrode and the greater the thickness of material projected through (ie., exterior touch surface), the greater will be the number of electrodes responding to the finger touch.

Ellipses 821 and 823 represent the palm of the user's hand. The palm is assumed to be above, but not in contact with, the touch surface. Ellipse 821 represents the palm of a right-handed user while ellipse 823 represents the palm of a left-handed user. There may be some parasitic capacitive coupling between the palm and the underlying electrodes. As shown in FIG. 8, electrodes 803–807 may be subject to background signals due to the palm of the user's hand.

Methods for obtaining an output signal from each of the electrodes and, if desired, compensating for gain variations between electronic channels, are well known by those of skill in the art and will therefore not be discussed in detail herein. Assuming an output signal from each electrode, there are numerous touch reconstruction algorithms that can be applied to the touchscreen system of the present invention. A few representative examples are provided below although it is understood that these examples are not exhaustive and that there are other touch reconstruction algorithms that are equally applicable to the invention.

Figure 9:
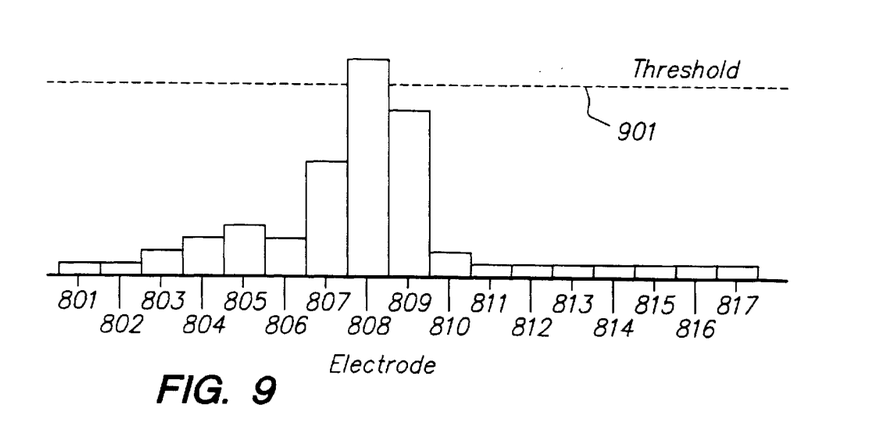
FIG. 9 is a schematic representation of the signal output from each of the electrodes shown in FIG. 8.

The first step of most touch reconstruction algorithms is simply determining that a touch has occurred. One of the simplest approaches to detecting a touch is based on an electrode output signal exceeding a signal level threshold. FIG. 9 is a schematic representation of the signal output from each of the electrodes shown in FIG. 8. As shown, only the signal from electrode 808 exceeds threshold level 901.

A problem with the simple threshold level approach illustrated in FIG. 9 can occur if the touch area is small compared to the electrodes and centered between two electrodes. In this situation the signal will be split between the two electrodes, possibly leading to insufficient signal in either electrode to surpass the threshold level. To overcome this problem the touch detection algorithm can be modified such that touch detection occurs whenever the sum of the signal levels from two adjacent electrodes exceeds a given threshold level. Similarly, the algorithm can be modified such that touch detection occurs whenever the sum of the signals from a predetermined number of adjacent electrodes (ie., 3, 4, . . . , all electrodes) exceeds a threshold level. A benefit of detecting touch with a small number of electrodes rather than a large number of electrodes is in palm rejection (i.e., minimizing false touch detection based on a large number of electrodes each outputting a small signal due to the proximity of a large object near the touchscreen). This technique of avoiding false touches is particularly effective if the long axes of the electrodes are horizontal, as shown in FIG. 8, rather than vertical.

After a touch has been detected using a technique like those described above, preferably the touch is localized. In this step a subset of all of the sensing electrodes is identified, the subset consisting of those sensing electrodes that are near the touch position. There are several benefits to this optional step. First, by limiting the number of electrodes the position determining algorithm can operate more efficiently and therefore faster. Second, the effects of palm-induced background signals and random electronic noise are reduced.

There are several ways to localize the touch. One way is to identify the neighboring pair of electrodes with the largest combined signal. Preferably an additional electrode on either side of the selected pair is added to the set of electrodes, resulting in a set of four electrodes that can be used to compute the X- and Y-coordinates of the touch. It is understood that greater numbers of electrodes can be included in the localized set of electrodes without departing from the invention.

Referring to FIG. 8 and assuming the number of localized electrodes is limited to four, the local group of sensing electrodes can be divided into a pair of odd-numbered or right-biased electrodes and a pair even-numbered or left-biased electrodes. The division of signal between these two pairs of electrodes provides an X coordinate measurement. For touch 819 of touchscreen 800, the left and right signal sums can be defined as follows:

$$L=S_{808}+S_{810}$$

$$R=S_{809}+S_{807}$$

The X coordinate, $X_t$, of the touch is given by:

$$X_t=L/(L+R)$$

This measured coordinate, $X_t$, can be easily offset and scaled as needed to match the coordinate system of the display device. For example:

$$X_{Display}=(\text{Magnification})(X_t)+\text{Offset}$$

The Y-coordinate of the touch can be calculated by a weighted sum. For example, if $Y_n$ are defined as the Y-coordinates of the centerlines of the sensing electrodes, the value of the touch Y-coordinate, $Y_t$, can be estimated from:

$$Y=(L*S_{809}*Y_{809}+R*S_{808}*Y_{808}+L*S_{807}*Y_{807}+R*S_{810}*Y_{810})/(2L*R)$$

Alternately, $Y_t$ may be determined by fitting a curve to the weighted signals $L*S_{809}$, $R*S_{808}$, $L*S_{807}$, and $R*S_{810}$. The left and right signal sums R and L are used here to correct for the biases in the electrode signals as a function of the X-coordinate. More sophisticated weighting and curve fitting schemes can also be used, including schemes in which corrections are made to the X-coordinate based on the Y value and vice versa.

As with some other touch technologies (e.g., acoustic, force, capacitive) the sensors of the present invention can provide a value, Z, corresponding to the strength of the touch. For example Z may simply be the sum of the signals for the local group of sensing electrodes, i.e., $S_{807}+S_{808}+S_{809}+S_{810}$.

The Z-coordinate can be used by the application software to dynamically adjust the touch threshold. Typically, the first interaction between a touch based kiosk and a new user is a touch by the user to 'wake up' a menu system. Often waking up the menu system also causes the kiosk to stop displaying either an attention getting image or some form of advertisement. For the first touch, it may be appropriate for the application to accept a touch that is based on a low Z threshold value since there would be little harm caused by the occasional false touch. During the initial touch the application software will see a stream of Z values. Preferably the system determines the maximum Z value during this initial touch and, based on the value of this maximum Z value, sets a second touch level threshold. For example, the second level could be set at some percentage (e.g., 50%) of the maximum Z value. Thus the Z value can be used to adapt to differences in finger sizes, the difference between gloved and ungloved fingers, etc.

Once the X- and Y-coordinates, and optionally the Z-coordinate, are calculated, the algorithm outputs the coordinates to the operating system.

In a variation of the above algorithm, odd and even numbered sensing electrodes are paired, thus effectively providing a bar electrode of constant width as a function of X (or Y, depending upon the orientation of the long axis of the electrodes). Thus in FIG. 8, electrodes 801 and 802 are paired, electrodes 803 and 804 are paired, etc. Alternately, electrodes 802 and 803 are paired, electrodes 804 and 805 are paired, etc. Based on these two pairing schemes, two tilted Y-coordinates can be calculated where each of the calculated Y-coordinates is determined from the average of the Y signal values.

Thus in the above example, $Y_1$ is determined from the electrode-pair signal amplitudes $(S_{807}+S_{808})$ and $(S_{809}+S_{810})$ while $Y_2$ is determined from the electrode-pair signal amplitudes $(S_{806}+S_{807})$ and $(S_{808}+S_{809})$, yielding:

$$Y_1((S_{807}+S_{808})*(Y_{807}+Y_{808})/2+(S_{809}+S_{810})*(Y_{809}+Y_{810})/2)/(S_{807}+S_{808}+S_{809}+S_{810})$$

$$Y_1((S_{806}+S_{807})*(Y_{806}+Y_{807})/2+(S_{808}+S_{809})*(Y_{808}+Y_{809})/2)/(S_{806}+S_{807}+S_{808}+S_{809})$$

Either weighted averages or curve-fits can be used. Since the bar electrodes formed by the pairs of electrodes in FIG. 8 are not absolutely horizontal, and since the tilt of even-odd pairs is the opposite of the tilt of odd-even pairs, $Y_1$, and $Y_2$ will deviate with opposite signs from the touch Y-coordinate by an amount proportional to the X-coordinate (assuming that X=0 is at the center of the touch region). Therefore averaging $Y_1$, and $Y_2$ will give the touch Y-coordinate (ie., $Y_t=(Y_1+Y_2)/2$).

Furthermore, the orthogonal or X-coordinate can be calculated from the difference of these values. Such algorithms are somewhat analogous to depth perception in binocular vision. Preferably the X-coordinate is calculated according to the equation:

$$X=A(Y_1-Y_2)+B$$

where A and B are constants that provide the desired scaling and offset. The area under the finger-touch peak in either signal-pair provides a Z value.

It should be understood that the touch algorithms described above are only meant as examples illustrating how both the X- and Y-coordinates can be determined from the sensing electrodes of the present invention. Various other touch algorithms may also be used with the touchscreens of this invention.

Electrode Design

There are a variety of electrode parameters that can be varied depending upon the overall system requirements. For example, the width of the individual electrodes (see width 111 in FIG. 1 or width 211 in FIG. 2) directly impacts the system complexity as a touchscreen using wider electrodes requires fewer electrodes, and thus fewer interconnects, electronic channels, etc. However, wider and thus fewer electrodes typically results in positional information being lost. To some extent this problem can be minimized by channel multiplexing, ie., coupling more than one electrode to each channel.

Figure 10:
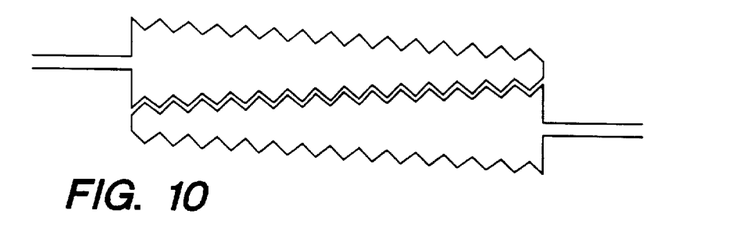
FIG. 10 is an illustration of two electrodes similar to those shown in FIG. 1 with jagged, interlocking electrode edges.
Figure 11:
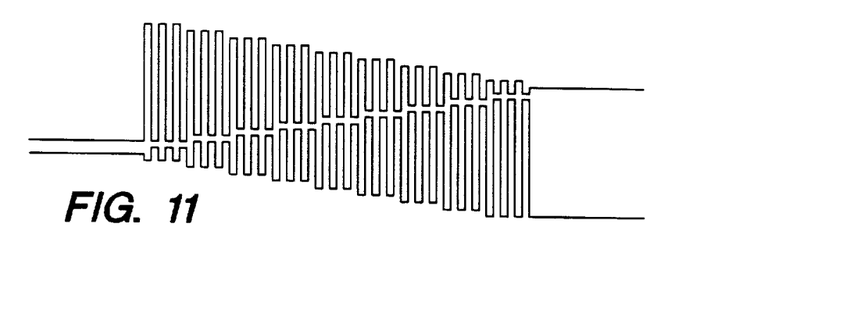
FIG. 11 is an illustration of two electrodes similar to those shown in FIG. 2 with an increased number of teeth.

Another parameter that can be varied to provide higher positional resolution is the shape of the electrodes. For example, instead of having a smooth outline as shown in FIG. 1, the edge of the electrodes can be made up of a series of interlocking 'teeth' as shown in FIG. 10. Similarly, the number of teeth in the electrodes shown in FIG. 2 can be increased as shown in FIG. 11.

Figure 12:
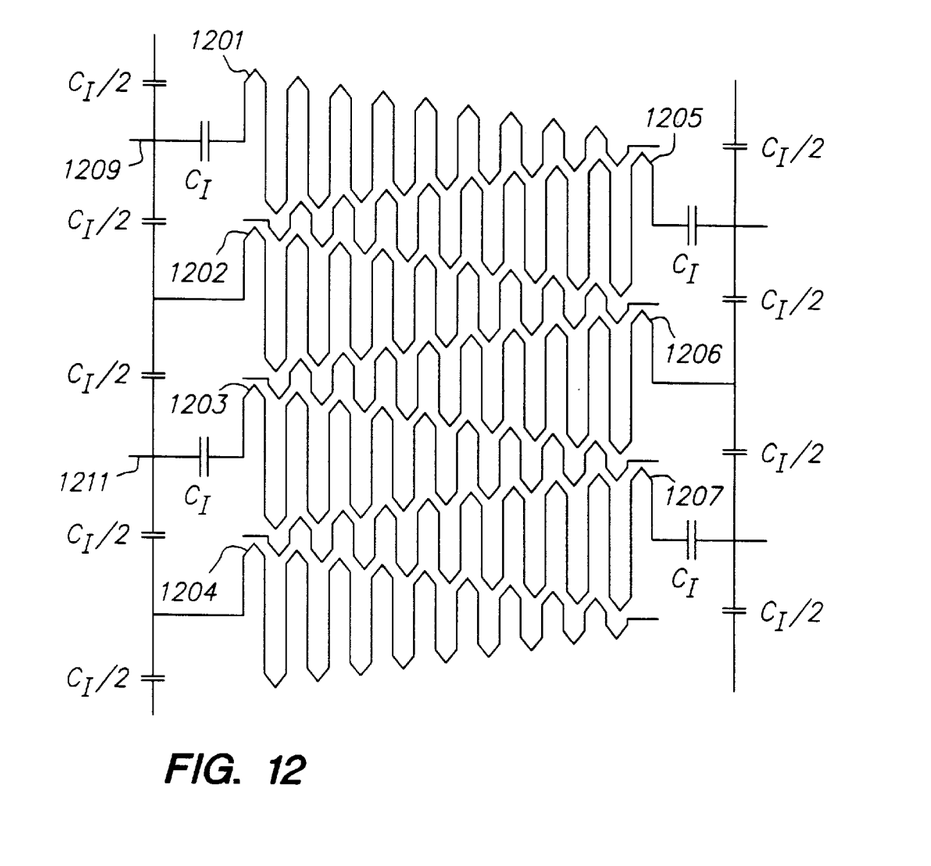
FIG. 12 is an illustration of an electrode design that increases resolution while decreasing the electronic channel count.

FIG. 12 is an illustration of a portion of an electrode design that incorporates electrodes shaped to achieve high resolution with an electronics design that reduces the number of required electronic channels. As shown, electrodes 1201–1204 are coupled to the touchscreen electronics on one side of the touchscreen while electrodes 1205–1207 are coupled on the second touchscreen side. It should be understood, however, that all of the electrodes can be coupled to the system electronics on one side, as shown in FIG. 4.

In the illustrated reduced electronic channels scheme, electrode 1201 is connected to electronics channel 1209 via an interconnect with a capacitance $C_I$. Similarly, electrode 1203 is connected to electronics channel 1211 via an interconnect with a capacitance $C_I$. In contrast, electrode 1202 is connected to both electronic channels 1209 and 1211 via interconnect capacitances of $C_I/2$. As a touch is moved from electrode 1201 to electrode 1203, the signal amplitudes will shift smoothly from channel 1209 to channel 1211. Note that the signal from electrode 1202 is split evenly between electronic channels 1209 and 1211. In this configuration, the fact that the present invention tolerates an interconnect impedance 721 (as previously described) is a great advantage. It should be understood that electrodes 1205–1207, and for this example electrodes 1205 and 1206, offer further smoothing of a touch moving from electrode 1201 to 1203.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A projective capacitive touchscreen, comprising:
   a substrate;
   a first plurality of non-linear, non-pad, position sensing electrodes coupled to said substrate, said first plurality of electrodes contained within a plane;
   a second plurality of non-linear, non-pad, position sensing electrodes coupled to said substrate, said second plurality of electrodes contained within said plane, said second plurality of electrodes interlaced with said first plurality of electrodes in a non-overlapping pattern;
   a first plurality of interconnects for coupling said first plurality of electrodes to a control circuit; and
   a second plurality of interconnects for coupling said second plurality of electrodes to said control circuit.

2. The projective capacitive touchscreen of claim 1, wherein a sensing portion of each electrode of said first and second pluralities of electrodes is substantially triangularly shaped, wherein said substantially triangularly shaped sensing portion is formed by a continuous length of a conductive material.

3. The projective capacitive touchscreen of claim 2, wherein said conductive material is a fine wire.

4. The projective capacitive touchscreen of claim 3, wherein said fine wire has a diameter between 10 and 25 micrometers.

5. The projective capacitive touchscreen of claim 2, wherein said conductive material is a conductive coating.

6. The projective capacitive touchscreen of claim 5, wherein said conductive coating is selected from the group consisting of ITO, ATO, and fluorine-doped tin oxide.

7. The projective capacitive touchscreen of claim 5, wherein said conductive coating is a non-transparent coating.

8. The projective capacitive touchscreen of claim 2, wherein said continuous length of said conductive material outlines said substantially triangularly shaped sensing portion.

9. The projective capacitive touchscreen of claim 8, wherein a first edge of said outlined substantially triangularly shaped sensing portion is non-linear and a second edge of said outlined substantially triangularly shaped sensing portion is non-linear.

10. The projective capacitive touchscreen of claim 2, wherein said continuous length of said conductive material forms a plurality of teeth of varying height, wherein an imaginary envelop encircling said plurality of teeth is of said substantially triangularly shape.

11. The projective capacitive touchscreen of claim 1, wherein an impedance of said first and second pluralities of interconnects is greater than 1 kΩ.

12. The projective capacitive touchscreen of claim 1, wherein an impedance corresponding to said first and second pluralities of interconnects is greater than a first impedance and less than a second impedance, wherein said second impedance corresponds to capacitive cross-coupling between electrodes of said first plurality of electrodes and adjacent electrodes of said second plurality of electrodes.

13. The projective capacitive touchscreen of claim 12, wherein said first impedance is greater than 1 kΩ.

14. The projective capacitive touchscreen of claim 1, wherein said first plurality of electrodes are coupled to a first plurality of electronic channels within said control circuit.

15. The projective capacitive touchscreen of claim 14, wherein at least some of said first plurality of electronic channels are coupled to multiple electrodes of said first plurality of electrodes.

16. The projective capacitive touchscreen of claim 14, wherein at least some of said first plurality of electrodes are coupled to multiple electronic channels of said first plurality of electronic channels.

17. The projective capacitive touchscreen of claim 1, wherein said first plurality of electrodes are coupled to a first plurality of electronic channels within said control circuit, and wherein said second plurality of electrodes are coupled to a second plurality of electronic channels within said control circuit.

18. The projective capacitive touchscreen of claim 17, wherein at least some of said first plurality of electronic channels are coupled to multiple electrodes of said first plurality of electrodes, and wherein at least some of said second plurality of electronic channels are coupled to multiple electrodes of said second plurality of electrodes.

19. The projective capacitive touchscreen of claim 17, wherein at least some of said first plurality of electrodes are coupled to multiple electronic channels of said first plurality of electronic channels, and wherein at least some of said second plurality of electrodes are coupled to multiple electronic channels of said second plurality of electronic channels.

20. The projective capacitive touchscreen of claim 1, wherein said control circuit utilizes a frequency-domain readout technique.

21. The projective capacitive touchscreen of claim 1, wherein said control circuit utilizes a time-domain readout technique.

22. The projective capacitive touchscreen of claim 1, wherein said control circuit determines frequency shifts in a plurality of LC oscillators.

23. The projective capacitive touchscreen of claim 1, wherein said control circuit determines a first touch coordinate from a first signal distribution within said first plurality of electrodes and a second signal distribution within said second plurality of electrodes, and wherein said control circuit determines a second touch coordinate from a third signal distribution between said first and second pluralities of electrodes.

24. A projective capacitive touchscreen, comprising:

a substrate;

a first plurality of non-linear, non-pad, position sensing electrodes coupled to said substrate, said first plurality of electrodes contained within a plane;

a second plurality of non-linear, non-pad, position sensing electrodes coupled to said substrate, said second plurality of electrodes contained within said plane, wherein a portion of said second plurality of electrodes is interlaced with a portion of said first plurality of electrodes in a non-overlapping pattern, said interlaced portion forming a multiple position coordinate determining region, and said non-interlaced portion forming a plurality of simple touch buttons;

a first plurality of interconnects for coupling said first plurality of electrodes to a control circuit; and a second plurality of interconnects for coupling said second plurality of electrodes to said control circuit.

* * * * *